(12) United States Patent
Voglewede et al.

(10) Patent No.: US 7,201,005 B2
(45) Date of Patent: Apr. 10, 2007

(54) MEASURED FILL WATER DISPENSER FOR REFRIGERATOR FREEZER

(75) Inventors: Ronald L. Voglewede, St. Joseph, MI (US); Marcus R. Fischer, St. Joseph, MI (US); Patrick J. Boarman, Evansville, IN (US); Daryl L. Harmon, Evansville, IN (US); Gary W. Wilson, Sr., Sellersberg, IN (US); Bradley L. Kicklighter, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 264 days.

(21) Appl. No.: 10/861,203

(22) Filed: Jun. 4, 2004

(65) Prior Publication Data

US 2005/0268624 A1 Dec. 8, 2005

(51) Int. Cl.
*B67D 5/62* (2006.01)
(52) U.S. Cl. ............... 62/126; 62/390; 222/146.6
(58) Field of Classification Search .......... 62/125–131, 62/340–356, 389–400; 222/146.6
See application file for complete search history.

(56) References Cited

U.S. PATENT DOCUMENTS

| | | | | |
|---|---|---|---|---|
| 3,937,362 A | 2/1976 | Salmijak et al. | ............... | 222/20 |
| 4,428,088 A | 1/1984 | Getz et al. | ............... | 8/158 |
| 4,573,325 A | 3/1986 | Chiu et al. | ............... | 62/129 |
| 5,129,548 A | 7/1992 | Wisniewski | ............... | 222/16 |
| 5,269,154 A * | 12/1993 | Schmidt | ............... | 62/275 |
| 5,429,272 A | 7/1995 | Luigi | ............... | 222/14 |
| 5,473,911 A | 12/1995 | Unger | ............... | 62/344 |
| 5,490,547 A | 2/1996 | Abadi et al. | ............... | 141/359 |
| 5,526,854 A | 6/1996 | Unger | ............... | 141/351 |
| 5,537,838 A * | 7/1996 | Mills et al. | ............... | 62/400 |
| 5,551,598 A | 9/1996 | Cutsinger | ............... | 222/52 |
| 5,829,263 A | 11/1998 | Park | ............... | 62/177 |
| 6,092,374 A | 7/2000 | Kang et al. | ............... | 62/74 |
| 6,355,177 B2 | 3/2002 | Senner et al. | ............... | 210/739 |
| 6,375,834 B1 | 4/2002 | Guess et al. | ............... | 210/85 |
| 6,613,236 B1 | 9/2003 | Guess et al. | ............... | 210/739 |
| 6,715,302 B2 * | 4/2004 | Ferragut, II | ............... | 62/129 |
| 2002/0189983 A1 | 12/2002 | Guess et al. | ............... | 210/87 |
| 2003/0019236 A1 | 1/2003 | Helms et al. | ............... | 62/338 |
| 2003/0074194 A1 | 4/2003 | Finnegan | ............... | 704/231 |
| 2004/0007516 A1 * | 1/2004 | Fritze et al. | ............... | 210/263 |
| 2004/0261433 A1 | 12/2004 | Gnadinger | ............... | 62/137 |
| 2004/0261434 A1 | 12/2004 | Zentner et al. | ............... | 62/137 |

FOREIGN PATENT DOCUMENTS

| | | |
|---|---|---|
| EP | 1019791 | 6/2002 |
| WO | 02/20392 | 3/2002 |
| WO | 03/008885 | 1/2003 |

* cited by examiner

*Primary Examiner*—William E. Tapolcai
(74) *Attorney, Agent, or Firm*—Robert O. Rice; John F. Colligan; Stephan Krefman

(57) ABSTRACT

A water dispenser for a refrigerator freezer having a water dispensing control including a measured fill mode of operation in which the water dispenser dispenses a predetermined amount of water and a manual fill mode of operation. The water dispensing control allows user selection of the units of measure, the type of container being filled and selection of the amount to be dispensed. A user display can display the selections and can display the amount dispensed in real time.

27 Claims, 11 Drawing Sheets

MEASURED FILL WATER DISPENSER FOR REFRIGERATOR FREEZER

BACKGROUND OF THE INVENTION

1. Field of the Invention

The invention relates to ice and water dispensers for refrigerator freezers. More particularly the invention relates to a water dispenser that can dispense measured amounts of water or can dispense water in a normal fill mode in which water is dispensed as long as an actuator is operated by the user.

2. Description of the Related Art

Refrigerator freezers having ice and water dispensers are known. Liquid dispensers that dispense measured amounts of liquid are also known.

SUMMARY OF THE INVENTION

The present invention is directed to a refrigerator freezer a water dispenser that can include a user accessible dispenser housing having a spout. The water dispensing control can include a measured fill mode of operation in which the water dispenser dispenses a predetermined amount of water through the spout and a manual fill mode of operation in which the water dispenser dispenses water through the spout as long as the water dispenser is activated. The water dispensing control can include a fill mode selector, a water valve connected to a source of water, a valve control connected to the water valve and the water dispensing control and a water dispensing actuator connected to the water dispensing control.

The water dispensing control can include a water flow sensor connected to the valve control.

The refrigerator freezer can include a user interface display and the water dispensing control can display the amount of water dispensed on the user interface display.

The water dispenser control can allow a user to select the units of measure for the amount of water dispensed.

The refrigerator freezer can include a user interface control connected to the valve control, and the user interface control can provide for user selection of the amount of water dispensed in the measured fill mode.

The user interface control can include one or more user operable selectors and a user interface display connected to the user interface control.

One of the user operable selectors can be a units selector and the units selections can include one or more of cups, ounces, liters and coffee cup quantities of water.

One of the user operable selectors can be a container selector and the container selections can include coffee pot, water bottle, custom, pitcher, favorite and preset containers.

The water dispensing actuator can be a press to fill selector on the user interface or a paddle located in the dispenser housing.

Another aspect of the invention is an ice and water dispenser for a refrigerator freezer including a dispenser housing in the freezer door including a water spout, an ice chute and a user interface including one or more user operable selectors. The ice and water dispenser can include a refrigerated water container connected to the water spout and an ice maker and ice dispenser in the freezer compartment positioned to provide ice pieces to the ice chute. The ice and water dispenser includes a dispenser control having a measured fill mode of operation in which the dispenser dispenses a predetermined amount of water through the spout, and a manual fill mode of operation in which the dispenser dispenses water through the spout as long as the dispenser is activated. The ice and water dispenser can include a user interface control connected to the user interface, a fill mode selector, a valve connected to the water container, a valve control connected to the user interface control and the valve, a water flow sensor connected to the valve control, a water dispensing actuator connected to the user interface control and an ice dispensing actuator connected to the user interface control.

The refrigerator freezer can include a filter for filtering water supplied to the refrigerated water container and the ice maker and the dispenser control can include a time of day and date function. The valve control can monitor filter usage by accumulating the amount of water flow and the elapsed time since the filter was last replaced. The valve control can communicate the filter status to the user interface control for display on a user interface display.

The dispenser control can further include monitoring power interruption to the refrigerator freezer and the time of day and date function can include a backup power supply. The dispenser control can measure the duration of a power interruption by storing the time of a reference clock and calculating the power interruption duration. The dispenser can display a power interruption message on a user display after power is restored advising the user that power has been interrupted and the duration of the power interruption.

DESCRIPTION OF THE INVENTION

The use of refrigerator water dispensers has changed with the advent of the addition of water filters to refrigerators. Consumers are now using filtered water from the refrigerator water dispenser instead of using sink mounted or countertop water filtration systems. Accordingly, consumers are requiring more flexibility and features from their refrigerator water dispenser. One aspect of the improved water dispenser for a refrigerator is the provision of measured fill capability to allow the user to select or choose predetermined amounts of water to be dispensed. While the water dispenser according to the invention is disclosed as part of an ice and water dispenser for a refrigerator freezer, those skilled in the art should understand that the water dispenser according to the invention can be used as a water dispenser only and not combined with an ice dispenser. Accordingly, the water dispenser according to the invention will be referred to as a water dispenser with the understanding that water dispenser is to be understood as referring to both a water dispenser and an ice and water dispenser.

Figure 1:
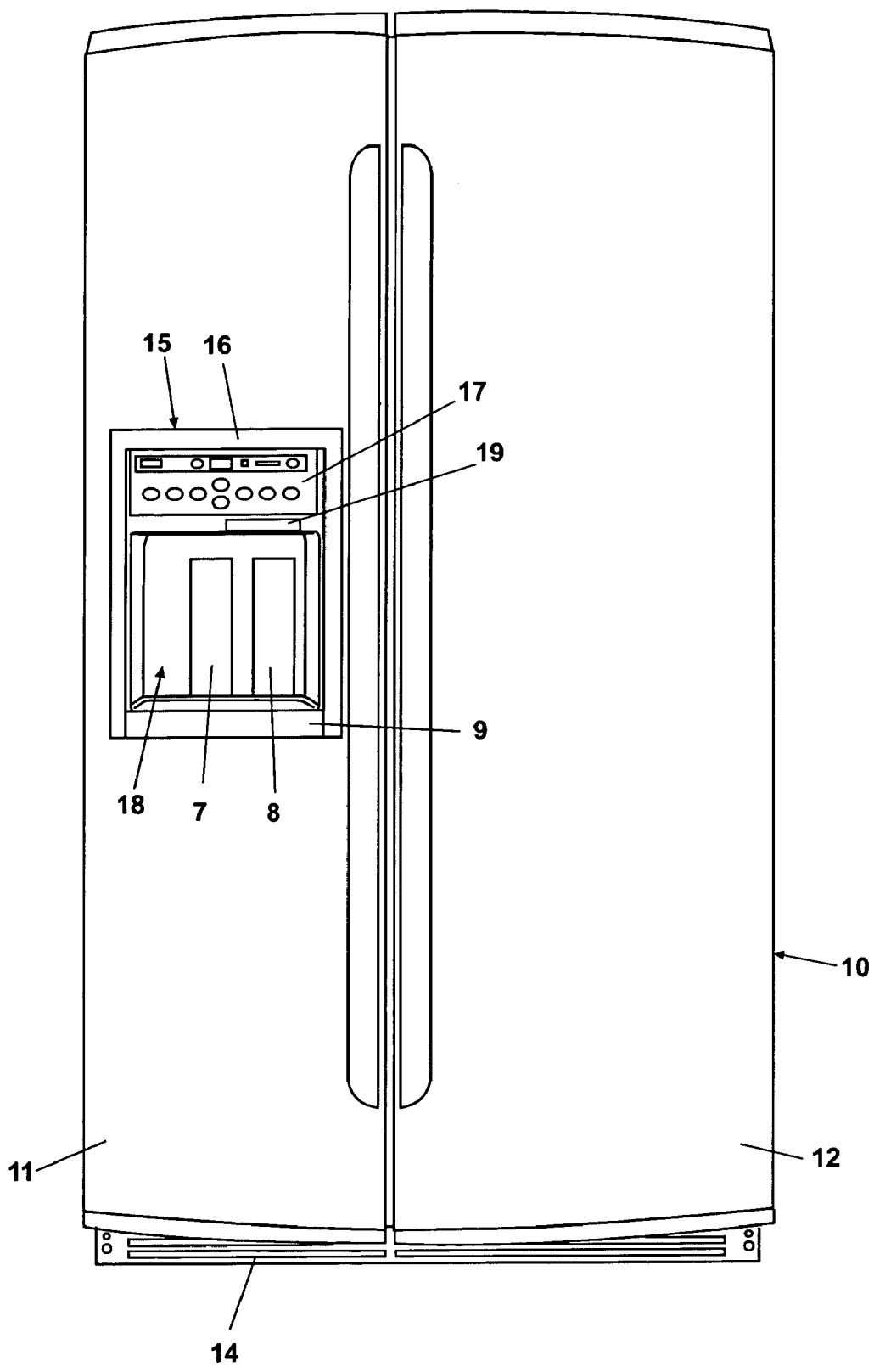
FIG. 1 is a perspective view of a refrigerator freezer equipped with an ice and water dispenser according to the invention.

Turning to FIG. 1, a refrigerator freezer 10 can include a water dispenser 15 mounted on the door 11 of the freezer compartment. The refrigerator compartment can have a door 12. While the refrigerator freezer shown in FIG. 1 is a side by side refrigerator freezer, the water dispenser according to the invention could be used in conjunction with a refrigerator freezer having a top or bottom freezer configuration, a refrigerator or a freezer having a single door. The water dispenser 15 can include a dispenser housing 16 mounted on the face of the freezer door 11. Those skilled in the art will understand that water dispenser 15 can be mounted on the face of refrigerator door as well as a freezer door. The dispenser housing 16 can include a user interface 17 and a recess 18 forming a cavity to receive a container to be filled. Dispenser housing 16 can also support a spout 19 for delivering water to a container. Spout 19 can be movable to facilitate filling of different size containers. Co-pending patent application US20030308, filed concurrently with this application, discloses movable spout arrangements that can be used with the water dispenser according to this invention which patent application is incorporated by reference. Dispenser housing 16 can include actuators 7 and 8 that can be paddles or pads in recess 18 for actuating the ice dispenser and water dispenser as is well known in the art. While actuators 7 and 8 are described as paddles or pads, those skilled in the art will understand that actuators 7 and 8 can be any mechanism arranged to be engaged by a container to be filed. Actuators 7 and 8 will be referred to as paddles in this application, but paddles should be understood as any mechanism arranged to be engaged by a container to be filled with ice pieces or water. Dispenser housing 16 can also include a shelf 9 in the bottom of the recess for supporting a container being filled.

Figure 7:
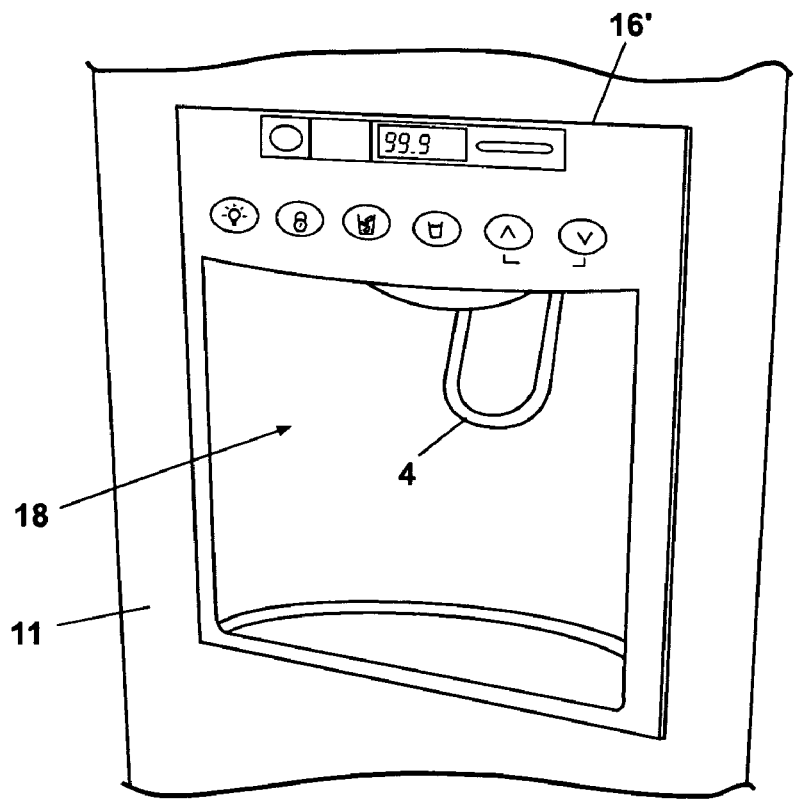
FIG. 7 is a partial perspective of one embodiment of a dispenser housing and user interface for the ice and water dispenser according to the invention.

Turning to FIG. 7 another dispenser housing embodiment 16' can be seen. Dispenser housing 16' can have a recess 18' for containers to be filled. In the embodiment of FIG. 7 a single actuator 4 can be provided to activate both water and ice dispensing. Those skilled in the art that the dispenser housings and actuators shown in FIG. 1 and FIG. 7 can be used as desired.

Figure 2:
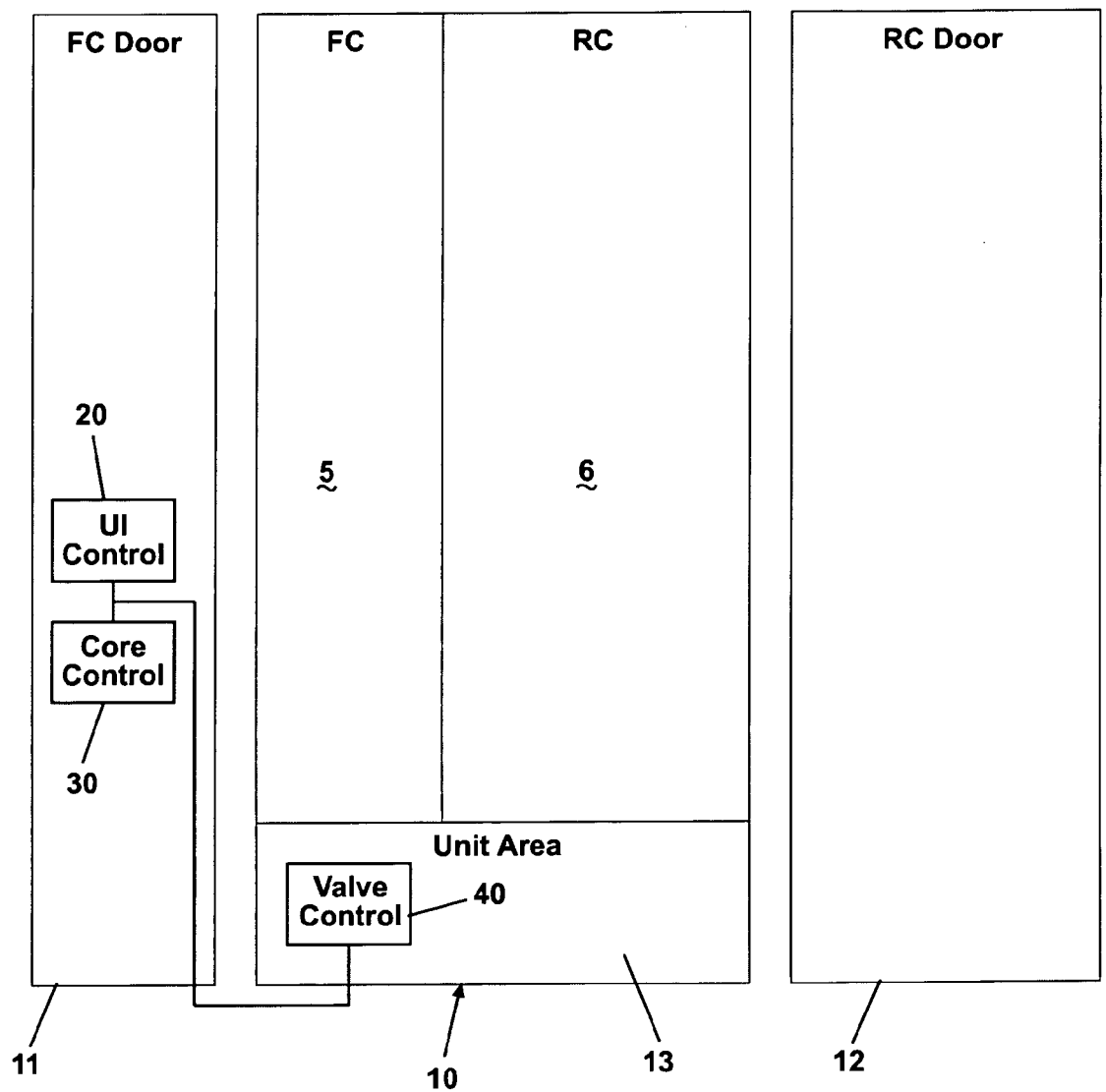
FIG. 2 is a schematic view of a refrigerator freezer showing one embodiment of locations of controls for the ice and water dispenser according to the invention.

Turning to FIG. 2, the location of certain of the water dispenser control components for one embodiment of the invention can be seen in schematic form. The water dispenser according to the invention can include a user interface control 20, a core control 30 and a valve control 40. User interface control 20, core control 30 and valve control 40 can each include a microcontroller. In the embodiment shown schematically in FIG. 2, the user interface control 20 and core control 30 can be located in the freezer compartment door 11. Valve control 40 can be located in the unit area 13 under the freezer compartment 5 and refrigerator compartment 6. While the operation of user interface control 20, core control 30 and valve control 40 will be described in connection with water dispensing operations, the controls can also provide control of ice making and ice dispensing operations as well. Communication between the user interface control 20, the core control 30 and valve control 40 can be via an inter-module simple protocol (ISP) bus connecting the controls that allows the three controls to communicate in operation. Those skilled in the art will understand that the bus, cables, interfaces on circuit boards and protocol, can be arranged to have a latency time sufficient to satisfy user expectations for response of the controls. Those skilled in the art will also understand that one or more of user interface control 20, core control 30 and valve control 40 can be positioned on a single circuit board or can otherwise be positioned elsewhere in a refrigerator, freezer or refrigerator freezer as desired.

Figure 8:
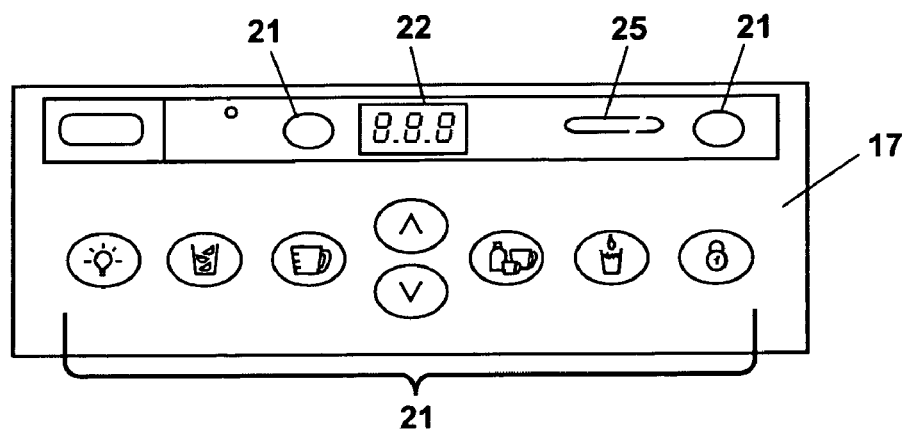
FIG. 8 is another embodiment of a user interface for the ice and water dispenser according to the invention.

Turning to FIG. 8, the user interface 17 of the water dispenser embodiment of FIG. 1 can be seen in greater detail. In this embodiment of the invention, user interface 17 can include a plurality of touch pads 21 and LEDs, not shown, to illuminate or indicate actuation of the touch pads 21. In the embodiment shown in FIG. 8 the operator touch pads 21 can be labeled: Locked, Press to Fill, Liters/Ounces/Cups, Increase, Decrease, Measured Fill, Crushed/Cubed, Auto/Nightlight/On, Filter Reset and Clear and can be arranged to control water dispenser and other refrigerator operations as will be described in greater detail. While touch pads 21 are shown in this embodiment of the invention, those skilled in the art will understand that buttons or other user operable switches can be used on user interface 17. User interface 17 can also include a display 22 that can be a LCD display that can display a plurality of 7-segment digits or other predetermined icons that are well known in the art.

Figure 18:
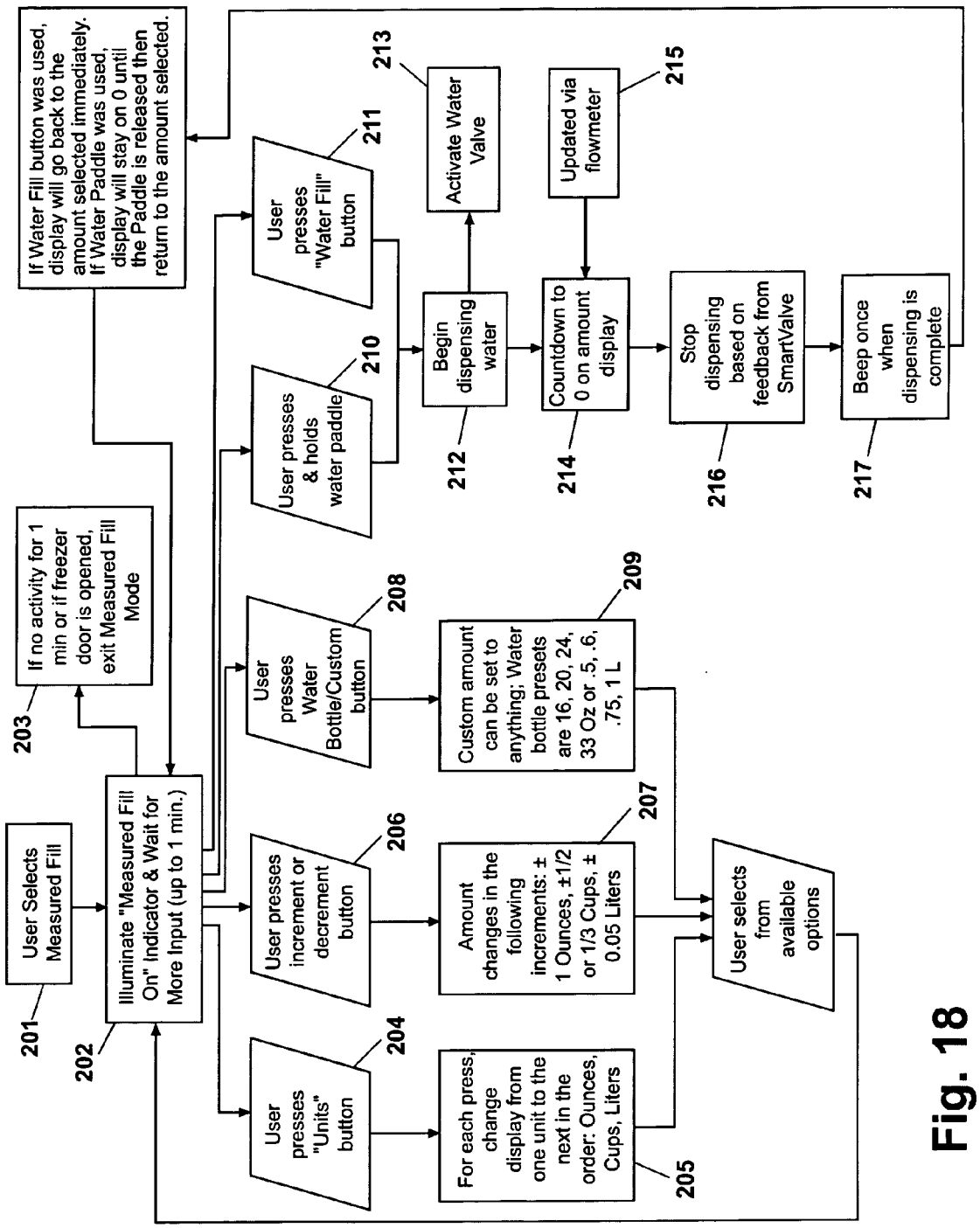
FIG. 18 is a flow chart illustrating measured fill operation of one embodiment of the control according to the invention.

The measured fill operation of the water dispenser embodiment of FIG. 1 and FIG. 8 can be seen by referring to FIG. 18. A user can select the measured fill mode of operation by touching the touch pad 21 labeled Measured Fill. Activation of the Measured Fill touch pad 21, block 201, can cause the user interface control 20 to illuminate the Measured Fill touch pad, block 202. The user interface control 20 can be arranged to allow the user a predetermined period of time in which to make a further selection, or if not, exit the measured fill mode, block 203, and return to the normal fill mode. Upon selection of the measured fill mode of operation the user can select the units of measure, and/or the type of container to be filled. To select the units of measure the user can touch the Liters/Ounces/Cups touch pad 21, block 204. For each time a user touches or presses the Liters/Ounces/Cups touch pad 21 the user interface control 20 can change the unit of measure to the next in sequence which can be: ounces, cups, liters, block 205.

While units of ounces, cups and liters are identified in the water dispenser embodiment of FIG. 1, FIG. 8 and FIG. 18, those skilled in the art will understand that any units of measure can be employed and the sequence can be varied as desired. The user can also select the quantity of water to be dispensed by touching the Increase or Decrease touch pads 21, block 206. Depending upon the units selected the amount of water dispensed can be changed in discrete amounts for each touch of the Increase or Decrease touch pads 21, block 207. For example, increase or decrease amounts can be 1 ounce, ¼ or ⅓ cup, or 0.05 liters. Those skilled in the art will understand that the increase/decrease amounts can be set to different amounts as desired. The units and amount of water selected can be displayed in display 22 to advise the user as to the units and amount selected. The user can also select the type of container by touching the desired touch pad 21, see FIG. 9 for one embodiment of container selection options, block 208. Upon selection of a container type, user interface control 20 can provide the user with pre-set options of fill quantities or can allow the user to select the fill amount using the Increase or Decrease touch pads 21, block 209. For example, a Water Bottle mode can be provided and specific amounts such as 16, 20, 24 and 33 ounces or 0.50, 0.60, 0.75 or 1.00 liters can be provided as selections. Those skilled in the art will understand that different or additional selections can be provided. As above, the container and quantity of water selected can be displayed on display 22. After making measured fill selections, or determining that prior selections are satisfactory the user can initiate a measured fill by pressing and holding water paddle 8, block 210, or touching and releasing the Press to Fill touch pad 21, block 211. Once activated the user interface control can cause the water dispenser to dispense the selected amount of water, blocks 212–217. As indicated in block 214, the water dispenser can be arranged to countdown the measured fill from the amount selected to "0" when the measured fill is complete. A measured fill dispense cycle can be arranged to be paused by releasing water paddle 8, or touching and releasing the Press to Fill touch pad 21 if touch pad 21 is used to start the dispense cycle. A dispense cycle can be paused for a predetermined period, such as one minute, after which the measured fill mode can be exited. A dispense cycle can be resumed by again pressing water paddle 8 or touching and releasing the Press to Fill touch pad 21. After completion of a dispense cycle the control can be arranged to remain in the measured fill mode for a predetermined period such as one minute. The control can be arranged to allow a user to abort a dispense cycle by touching and releasing the Measured Fill touch pad 21. The control can also be arranged to prohibit water dispensing when the freezer compartment door 11 is opened. Those skilled in the art will understand that the water dispenser 15 can be arranged to count up as the container is filled in the measured fill mode instead of counting down to zero as the selected amount of water is dispensed.

An example of a measured fill operation can be seen by referring to blocks 212–217. When a user touches or presses the Water Fill touch pad 21 or presses a container against water paddle 8, block 210, the user interface control 20 can send a message on the ISP bus to the valve control 40 to begin dispensing the selected amount of water, block 212. Valve control 40 can activate water valve solenoid 44, block 213, and can begin monitoring flow sensor 41, block 215. User interface control 20 can monitor the water flow data in valve control 40 and can operate a countdown on display 22. When the selected amount of water has been dispensed, valve control 40 can de-energize water valve solenoid 44 and can send a message via the ISP bus to the user interface that dispensing has stopped. The user interface control 20 can provide an audible signal to the user that dispensing is complete by energizing a piezo beeper, not shown. In the embodiment of FIG. 1, FIG. 8 and FIG. 18 the piezo beeper can be a 4 kHz beeper. Those skilled in the art will readily understand that other audible signal devices can be used to provide signals to indicate completion of measured fill dispensing as well as for other events that can include confirmation that a command has been accepted, an error signal to advise the user of error conditions and the like.

Figure 9:
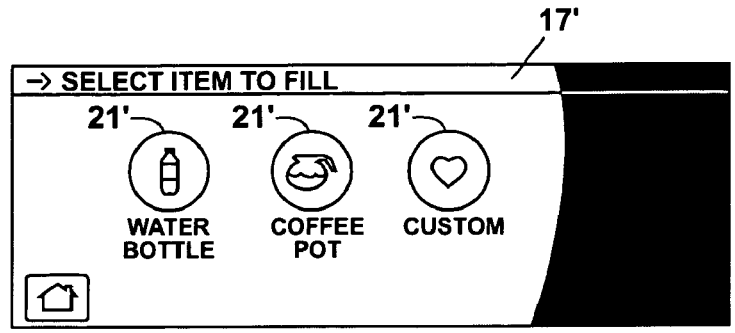
FIG. 9 is another embodiment of a user interface illustrating selection of an item to fill.
Figure 10:
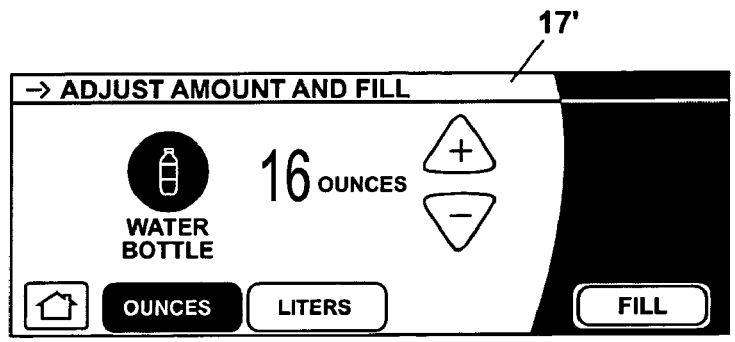
FIG. 10 is the user interface of FIG. 9 illustrating adjustment of the amount to fill a water bottle.
Figure 11:
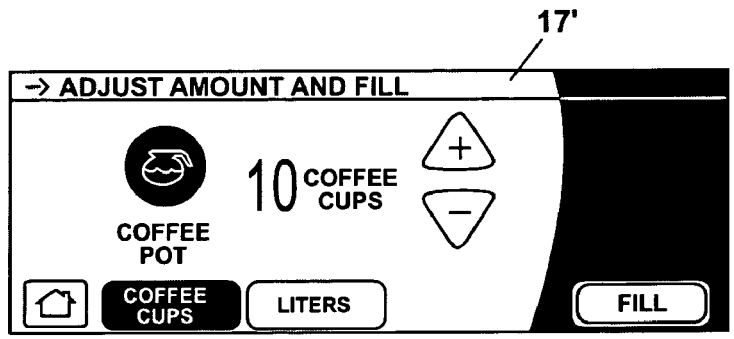
FIG. 11 is the user interface of FIG. 9 illustrating adjustment of the amount to fill a coffeepot.
Figure 12:
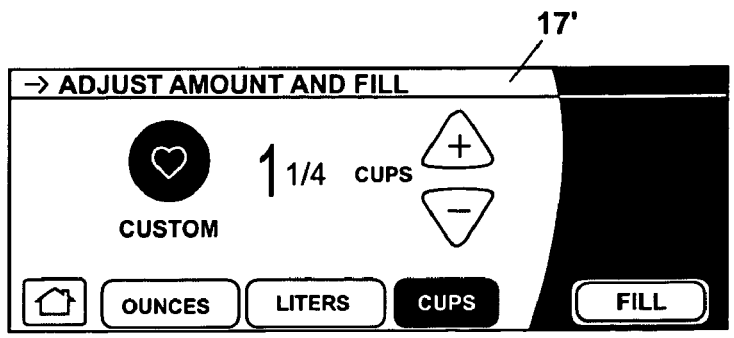
FIG. 12 is the user interface of FIG. 9 illustrating adjustment of the amount to fill a custom container.

The embodiment of the invention illustrated in FIG. 9 through FIG. 12 can include a user interface 17' that can be arranged to provide the user with a selection of type of container to be filled and to set the amount of water to be dispensed into the container. In the embodiment of FIG. 9 through FIG. 12 user interface 17' can be a touch screen device that is well known in the art. FIG. 9 illustrates selections that can include Water Bottle, Coffee Pot and Custom touch pads 21'. User interface control 20 can cause display of available container selections as touch pads 21' when the user has touched or pressed the Item to Fill touch pad, on a previous screen not shown. While Water Bottle, Coffee Pot and Custom selections are illustrated in FIG. 9, those skilled in the art will understand that other selections can be provided in lieu of, or in addition to those selections, and can include Pitcher, Favorite and Preset among others. FIG. 10, FIG. 11 and FIG. 12 illustrate alternatives that can be available to a user depending on the type of container and units selected and show the touch pads that can be displayed on the touch screen. For example in FIG. 10, the user has selected Ounces and has touched the + touch pad enough times to reach 16 as the number of ounces to be dispensed. As above, once the user has completed selection of, or confirmation of the container and amount of water to be dispensed, touching the Fill touch pad 21' or pressing the water dispensing paddle 8 can initiate a measured fill dispense cycle of the selected amount of water as described above.

When the measured fill mode is not selected, block 201, the water dispenser can operate in a normal fill mode. In the normal fill mode, the user interface control 20 can cause the water dispenser to dispense water as long as the water paddle 8 or Press to Fill touch pad 21 are actuated. In the normal fill mode the water dispenser can display the amount of water dispensed in display 22. In the embodiment of FIG. 1, FIG. 8 and FIG. 18 the user interface control can be arranged to display the amount of water dispensed in ounces. However, those skilled in the art will readily understand the units of measure can be in other units of measure instead of ounces. The user interface control 20 can cause a display of the amount of water dispensed during operation in the normal fill mode. As mentioned above, valve control 40 can track the amount of water dispensed by monitoring and accumulating the signal produced by the flow sensor 41 through flow sensor interface 43. User interface control 20 can periodically send a query over the ISP bus to the valve control to determine the amount of water dispensed in the current normal fill cycle. The user interface can display the result on display 22 and can update the information at a rate sufficient to provide essentially real time display of the amount of water dispensed. In the normal fill mode the care control 30 can be arranged to prohibit dispensing water when the freezer door 11 is open. Those skilled in the art will understand that valve control 40 can be arranged to provide a maximum dispensing time for the normal fill mode to protect system components.

User interface control 20 can be arranged to allow a user to program the amount of water to be dispensed by inputting and saving to non-volatile storage of a microcontroller, not shown, a custom or preset amount by increasing or decreasing a default amount of water. In another embodiment users can program the amount of water to be dispensed in a teach and repeat mode where a user can manually fill a container and the amount of water dispensed can be saved in microcontroller non-volatile storage under a Favorites, Custom or Preset, or similar setting or button. Those skilled in the art will understand that quantities to be dispensed, and other values that might be desired to be user adjustable, can be stored in non-volatile storage of a microcontroller. The microcomputer non-volatile storage can be factory programmed, flash programmed, user programmed or can be user programmed using teach and repeat algorithms all as are well known in the art.

User interface control 20 can be arranged so that when the measured fill mode is selected and filling of the container has commenced, the user interface control can pause the fill mode in the event the user moves the container out of contact with paddle 8 if filling was initiated by pressing the paddle 8. Similarly, user interface control 20 can pause the fill mode if the user touches the Press to Fill touch pad again during filling. If the user resumes the measured fill mode within a predetermined amount of time, that for example can be 2 minutes, user interface control 20 will resume and complete the measured fill dispensing cycle. If the user does not resume the measured fill mode within the predetermined amount of time, the user interface control can reset to the normal fill mode.

As noted above dispenser housing can include an ice dispensing paddle 7 in recess 18. User interface control 20 can be arranged to control dispensing of ice pieces upon actuation of paddle 7 by energizing an ice dispenser motor, not shown. User interface control 20 can also be arranged to allow a user to operate the ice dispenser by touching a touch pad 21 on the user interface 17. Thus, ice dispensing can be accomplished by pressing a container against paddle 7 or by touching a Dispense Ice touch pad 21 on user interface 17.

Figure 3:
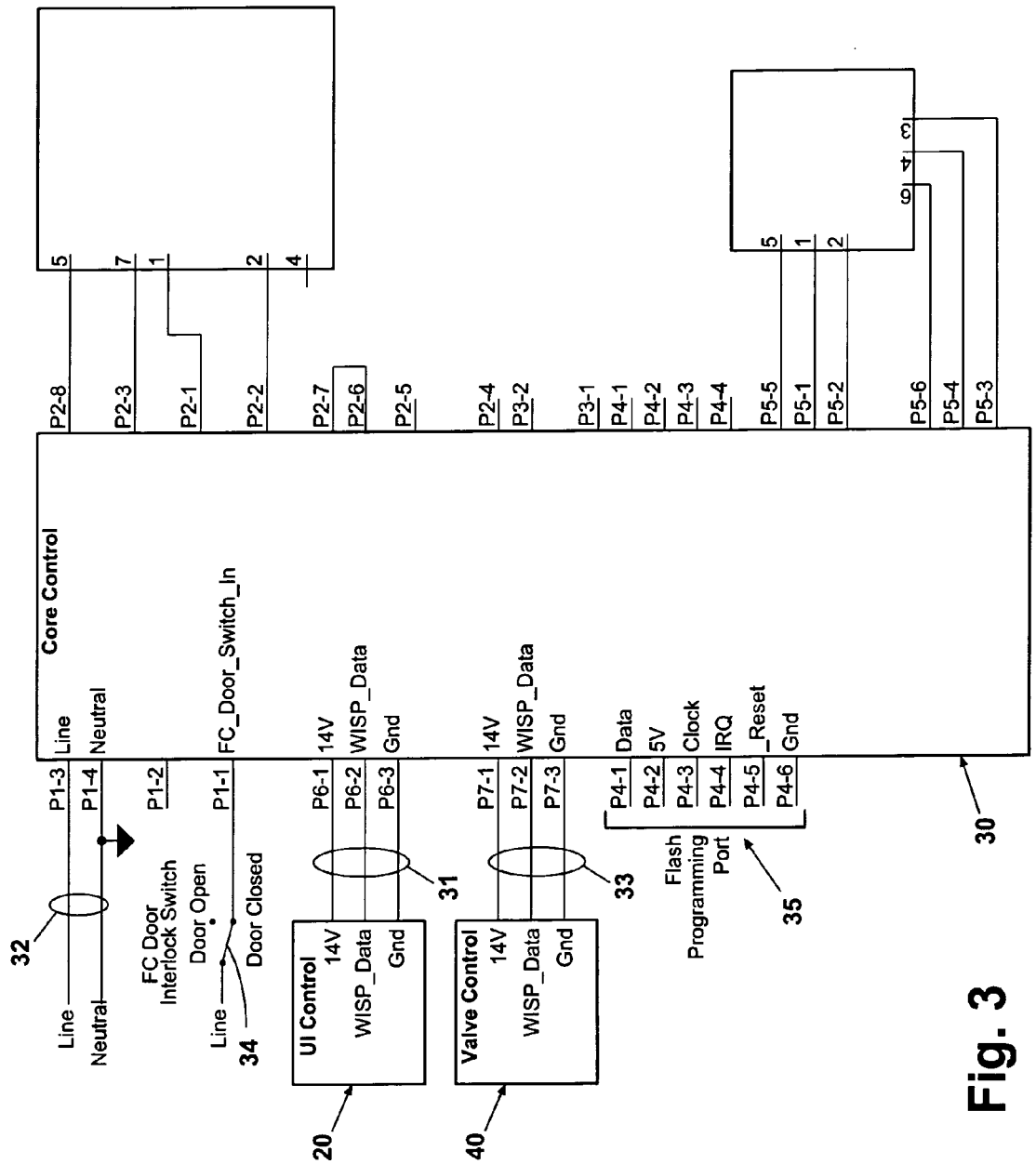
FIG. 3 is a block diagram of one embodiment of a portion of the control for the ice and water dispenser according to the invention.
Figure 4:
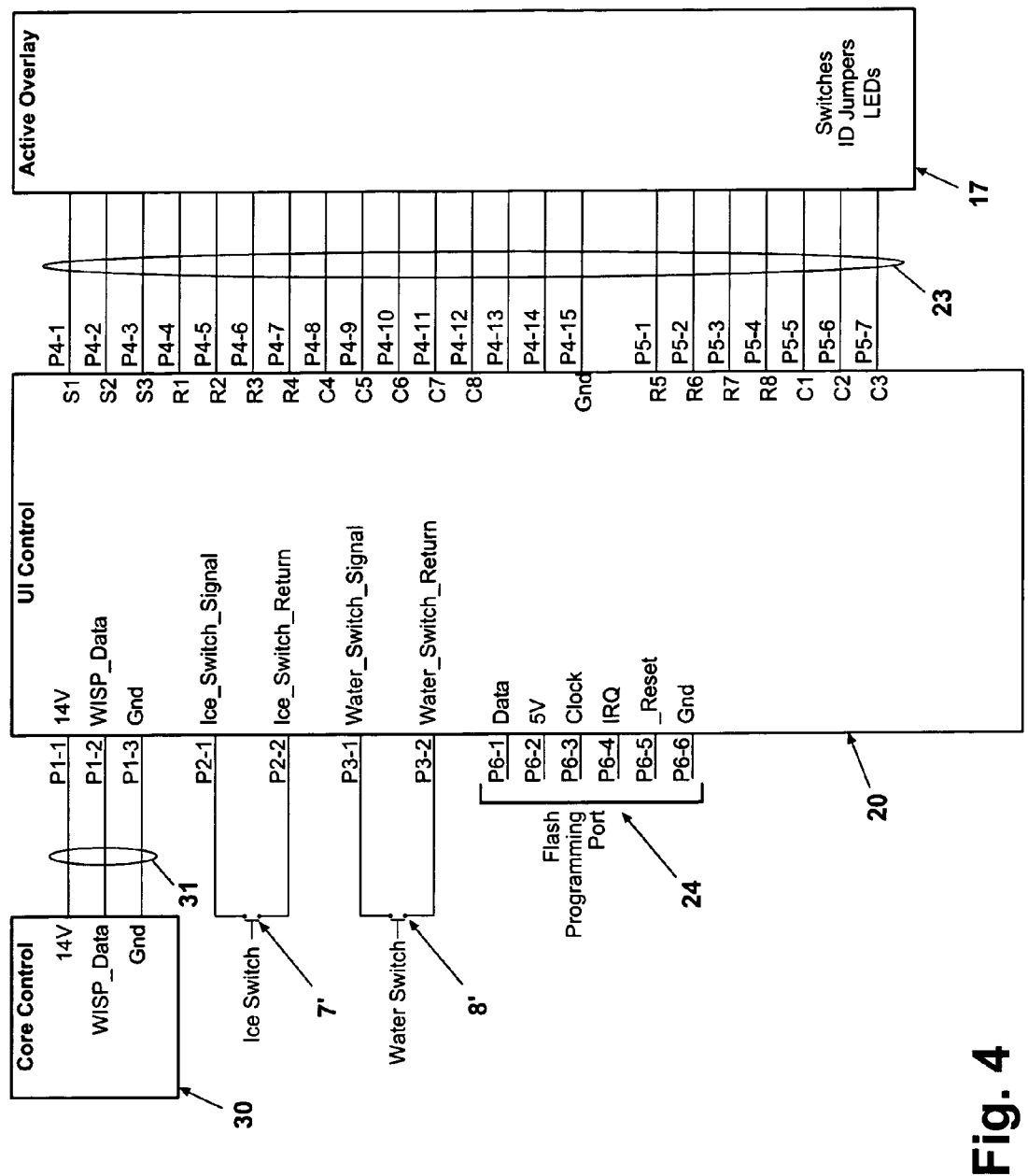
FIG. 4 is a block diagram of one embodiment of another portion of the control for the ice and water dispenser according to the invention.

Turning to schematic drawings FIG. 3, FIG. 4 and FIG. 5 the operation and interaction of the user interface control 20, the core control 30 and the valve control 40 will be described in greater detail. User interface 20 can be a smart control and can include a microcontroller, not shown, mounted on a circuit board as is well known in the art. The user interface control 20 can provide for user interaction with the ice and water dispensers. The user interface control 20 can be positioned adjacent user interface 17 which can be a traditional active overlay or a touch sensor active overlay device as are well known in the art. User interface 17 can include switches, such as touch pads 21, LEDs and one or more LCD displays such as display 22 and can include one or more phototransistors, and/or IR sensors if it is desired to measure ambient light conditions or detect motion in the vicinity of the water dispenser 15. User display 22 can include one or more 7-segment LCD displays as are well known in the art. User interface 17, including the active overlay, can be connected to user interface control 20 by a pin connector or cable 23 as is well known in the art. User interface control 20 can read the user interface/active overlay buttons, switches, touch pads, phototransistor, if used, and any other sensors. The user interface control 20 can drive the active overlay LEDs, and LCDs. User interface control 20 can be connected to core control 30 by a cable 31. Core control 30 can provide power and communicate with user interface control 20 via cable 31. The user interface control 20 can be the master on the ISP bus and can communicate via the ISP bus with the core control 30 and valve control 40. Paddles 7 and 8, FIG. 1, can be arranged to operate an ice switch 7' and a water switch 8' connected to the user interface control 20. User interface control 20 can control operation of other portions of the ice and water dispenser shown in outline form on the right side of the core control 30 shown in FIG. 3. Those skilled in the art will understand that other typical ice and water dispenser components such as an ice dispenser motor, an ice crusher, the ice maker or other user controlled refrigerator freezer components can be controlled by the user interface control 20 and operated by core control 30 if desired.

A microcontroller, not shown, can be incorporated in the user interface control 20 and can be programmed with decision software that can operate on an "if" "then" basis in which an action to be taken can be based on the input can be found in look up tables stored in non-volatile storage or memory as is well known in the art. The software can be programmed to include possible modes of operation, possible inputs and possible, and if desired, maximum outputs. The programming of the user interface microcontroller, not shown, can be general to cover all known and anticipated embodiments of the ice and water dispenser. The user interface microcontroller can be arranged for flash programming of flash (non-volatile) memory. Calibration values and features can be programmed into user interface control 20 by flash programming to set a particular user interface control 20 for the brand/model of refrigerator freezer in which it will be used. User interface control 20 can include a flash programming port 24 to facilitate programming of the microcontroller during manufacturing, or in the field, as will be readily understood by those skilled in the art.

Core control 30 can include a microcontroller, not shown, and can be responsible for ice dispensing, heater operation, power outage detection and measurement, and reading of freezer compartment door status. A microcontroller, not shown, an be provided for core control 30 and can be similar to a microcontroller that can be included in user interface control 20 and can be programmed with similar decision software. Core control 30 can include a power supply for the core control 30, the user interface control 20 and the valve control 40 and can be connected to the power supply for the refrigerator freezer via cable 32. Core control 30 can be a slave on the ISP bus and communicate, via the ISP bus, with the user interface control 20. Core control 30 can also be connected to the valve control 40 by cable 33. Cable 33 can provide ISP communication with the valve control 40. Core control 30 also can include a flash programming port 35 to permit flash programming of a core control microcontroller, not shown, to embed information in the flash memory or non-volatile storage of the core control microcontroller corresponding to the brand/model of refrigerator freezer the core control will be used in. As mentioned above, other components typically included in an ice and water dispenser such as an ice dispenser motor, an ice door motor or control, or other refrigerator freezer features can be connected to and controlled by the core control 30 under the direction of the user interface control 20. One or more of the user interface control 20, core control 30 or valve control 40 can include a low voltage power supply. Those skilled in the art will understand that a low voltage power supply can be provided separately for each control or can be a single low voltage power supply for the three controls.

As mentioned above, the water dispenser can be arranged to interrupt ice or water dispensing in the event the freezer door 11 is opened. A freezer compartment door switch 34 can be connected to core control 30 to interrupt/prevent operation of the ice or water dispenser when the freezer door 11 is open. As shown in FIG. 3, core control 30 can be connected to line voltage through door switch 34.

Figure 5:
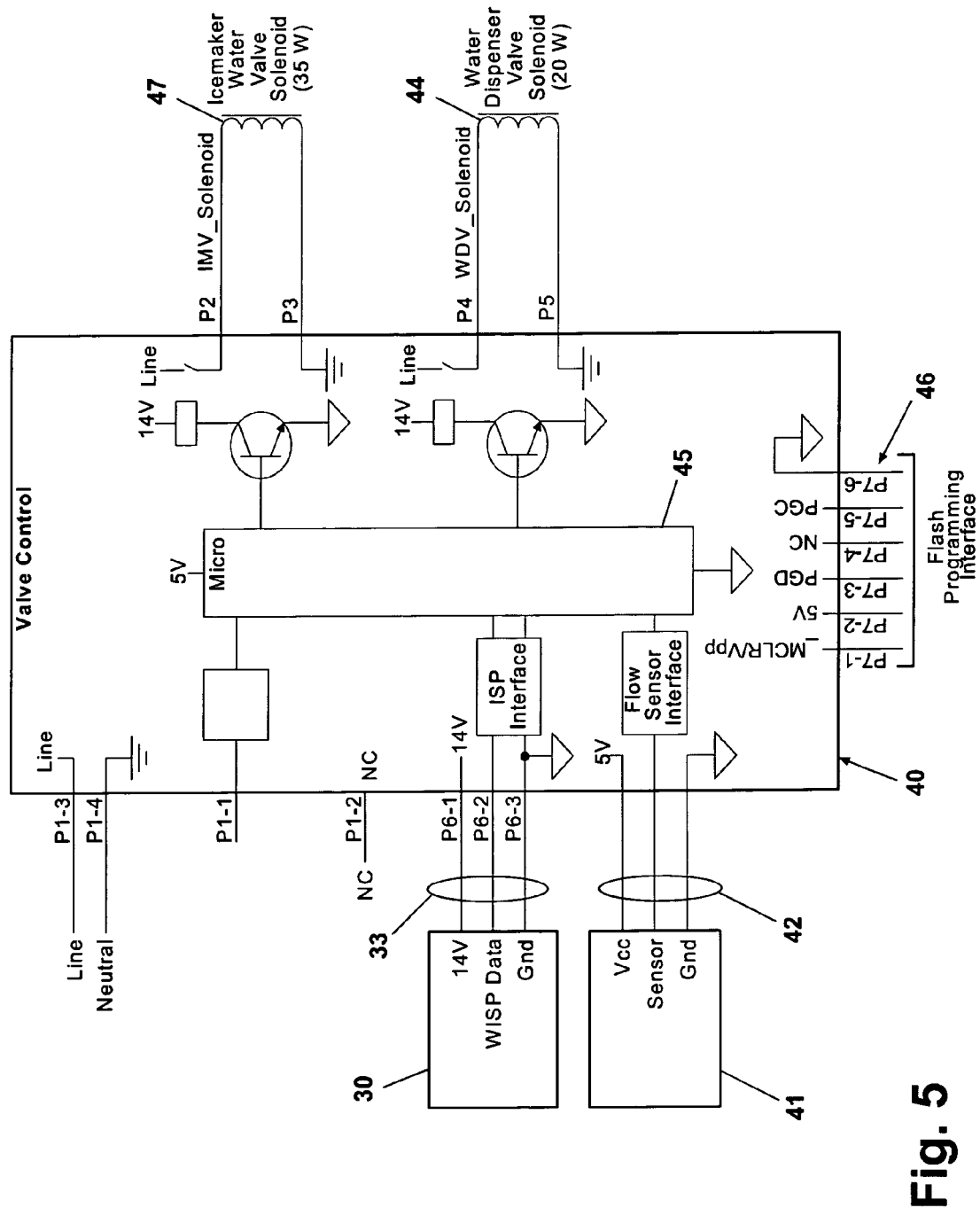
FIG. 5 is a block diagram of one embodiment of another portion of the control for the ice and water dispenser according to the invention.
Figure 6:
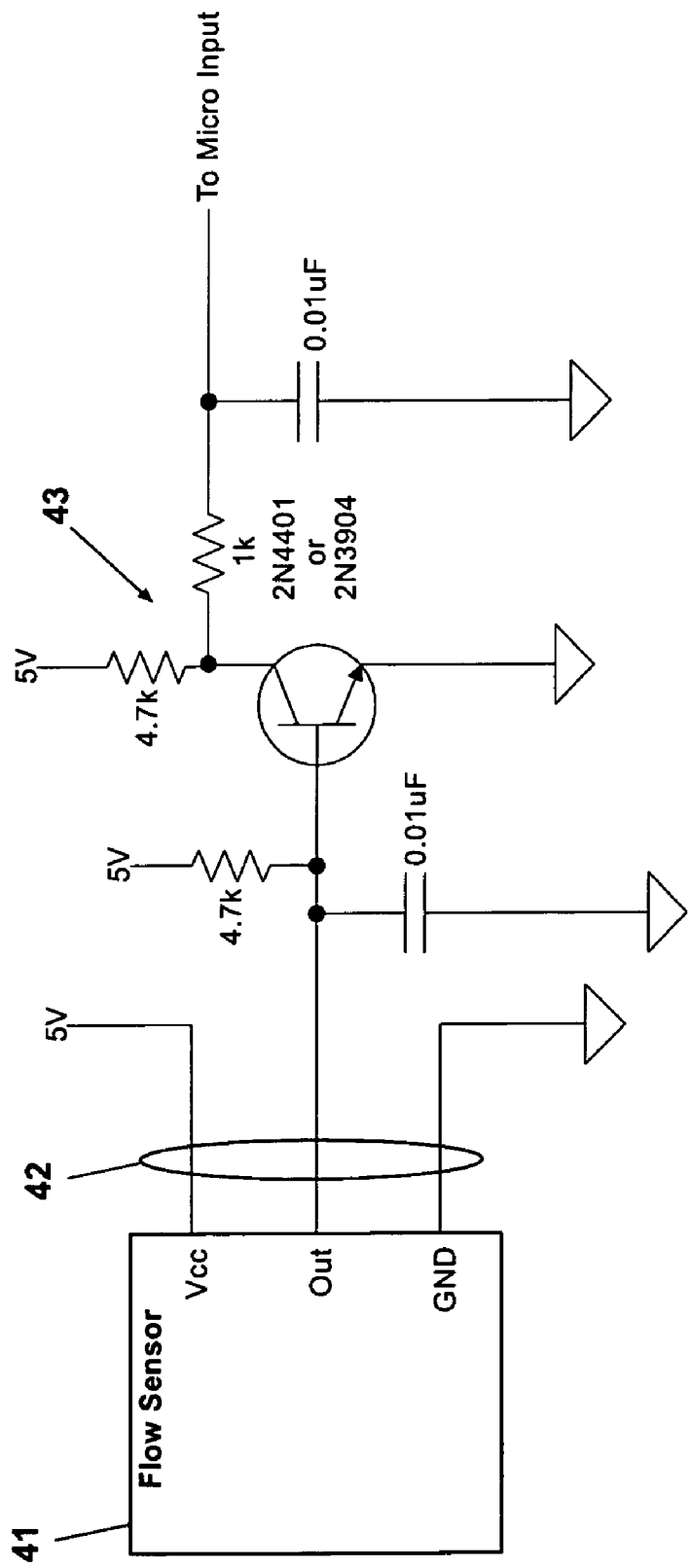
FIG. 6 is a circuit diagram of one embodiment of a flow sensor interface portion of the control for the ice and water dispenser according to the invention.

Turning to FIG. 5, valve control 40 can be connected to core control 30 by cable 33 as mentioned above. Valve control 40 can be mounted with a solenoid valve assembly, not shown, that can have one solenoid valve for water dispensing and one solenoid valve for icemaker fill. The valve assembly can include a flow sensor 41 on the inlet side of the water dispensing and icemaker fill valves to monitor flow to both valves. While two water valves are included in this embodiment, those skilled in the art will understand that a single water valve or more than two water valves can be used if desired. Those skilled in the art will understand that valve control 40 can be incorporated in core control 30 instead of being a separate control.

Valve control 40 can be responsible for water dispensing, filling of an icemaker and keeping track of water usage and elapsed time on the water filter 14 and can include a microcontroller 45. Valve control 40 can be arranged to dispense water to an icemaker in response to a signal from the icemaker to begin an ice making cycle. Alternately, an icemaker can communicate with the user interface control 20 and the user interface control 20 can communicate with the valve control via the ISP bus to cause valve control 40 to fill the icemaker to begin an ice making cycle. The valve control 40 can read the flow sensor 41 input and can drive the water dispenser valve solenoid 44 and icemaker fill valve solenoid 47 to provide the amount of water directed by the user interface control 20. The amount of water dispensed to an ice maker the ice maker fill valve can be controlled by the user interface control 20 or can be flash programmed into the valve control 40 in the case of the icemaker fill valve. The valve control 40 can be a slave on the ISP bus and can communicate via the ISP bus with user interface control 20. Water dispensing can be commanded by the user interface control 20.

As mentioned above, there can be two types of water dispensing, normal fill and measured fill. In normal fill the user interface control 20 can command the valve control 40 via the ISP bus to dispense water until the user interface control 20 commands the valve control 40 to stop. In measured fill the user interface control 20 can command the valve control 40 via the ISP bus to dispense a specific amount of water. The valve control 40 can dispense the specific amount of water by reading the input from flow sensor 41. Flow sensor 41 can be a Hall effect sensor that is well known in the art, and can be connected to valve control 40 by cable 42. Those skilled in the art will understand that other well known flow sensors can be used in lieu of a Hall effect sensor such as a reed switch. Flow sensor 41 can be arranged with respect to the water valve or water valves, not shown, to generate signals in response to water flow through the water valve or valves. Flow sensor 41 can produce a pulse for every predetermined amount of water that passes through flow sensor 41 (volume_per_pulse). Those skilled in the art will readily understand that a single water valve can be used to supply water to both the water dispenser and to an icemaker using a diverter or two-way valve, or separate valves can be provided. In the event that separate valves are provided for the water dispenser and an icemaker, valve control 40 can be arranged to control both valves.

Valve control 40 can be connected to line voltage to provide power to operate a water valve or valves as is well known in the art. Valve control 40 microcontroller 45 can track the amount of water measured by the flow sensor and communicate the information to the user interface control 20 via the ISP bus. Valve control 40 can energize water valve solenoid 44 to dispense water in response to a message on the ISP bus from the user interface control 20. As mentioned above, the message on the ISP bus to the valve control 40 can be to dispense a specific amount of water. Valve control 40 can drive water valve solenoid 44 through a relay or an opto-isolated triac as is well known in the art. Valve control 40 can track the amount of water dispensed through the valve and terminate activation of water valve solenoid 44 when the requested amount of water is dispensed. Valve control 40 can be ready to respond to a "how much water have you dispensed" query from the user interface control 20 and can report the quantity dispensed to the user interface control 20 via the ISP bus. When the water dispenser is operated in the normal fill mode, the valve control 40 can energize water valve solenoid 44 in response to a message from the user interface control 20 via the ISP bus and can continue to dispense water until directed to stop by the user interface control 20. The valve control 40 can also track the amount of water dispensed and can provide information to the user interface control 20 via the ISP bus for display on the user interface display 22 similar to a gas pump display. Valve control 40 can also be arranged to dispense a predetermined measured amount of water to fill an ice maker mold. For example, valve control 40 can be arranged to dispense 130 cubic centimeters (cc) of water to the ice maker in response to a message over the ISP bus. Valve control 40 can include a flash programming port 46 to allow programming of the flash memory in microcontroller 45 for operation with the brand/model refrigerator freezer for which the particular control is intended, water filter data, valve calibration values, ice maker water fill quantity, maximum dispensing periods and volumes.

Flow sensor 41 can be connected to microcontroller 45 by a flow sensor interface circuit 43. Flow sensor interface 43 can be a well known filter amplifier signal conditioning circuit for flow sensor 41 that can be a Hall effect sensor as described above. The flow sensor interface circuit 43 can be arranged to provide a clean signal (for example pulses) to microcontroller 45 representative of the volume (for example volume_per_pulse) of water passing through flow sensor 41 as described above.

Valve control 40 can be arranged to determine if the flow sensor 41 has failed and send a signal over the ISP bus. If the flow sensor 41 fails, valve control 40 can use a time-based algorithm to fill the icemaker using an assumed flow rate. However, measured fill operations could not be selected until the flow sensor is repaired.

Figure 15:
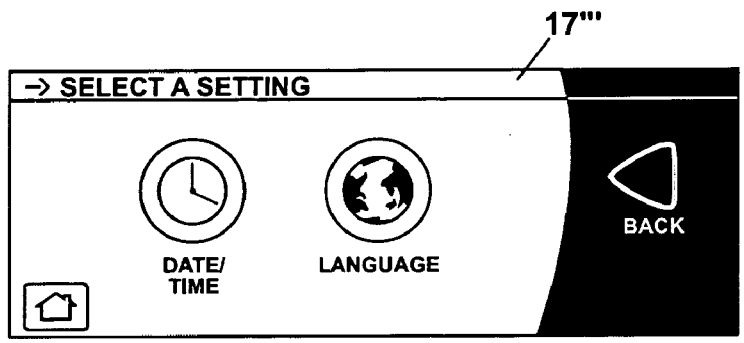
FIG. 15 is the user interface of FIG. 9 illustrating selection of date/time for adjustment.
Figure 16:
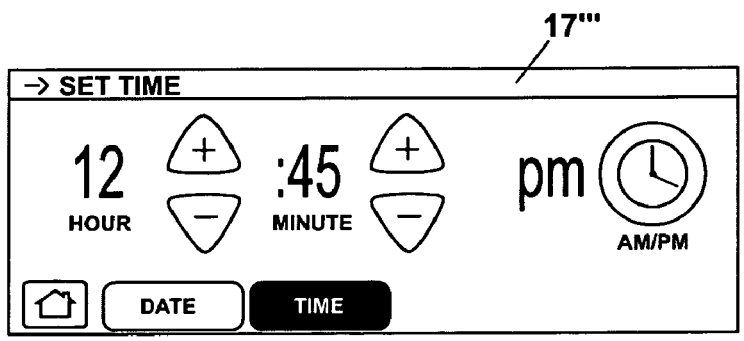
FIG. 16 is the user interface of FIG. 15 illustrating display and adjustment of the time of day.

The core control 30 can include a day and date clock and can provide a time of day and date display on the user interface. In the embodiment shown in FIG. 15 and FIG. 16 the user interface 17''' illustrates the capability of displaying and setting the correct time and date. Once the clock is set, the core control 30 can be arranged to keep the time of day and date correct. In addition, the provision of a time of day and date clock in core control 30 can enable provision of additional features described in the following paragraphs. Core control 30 can provide time of day and date information to the user interface control 20 via the ISP bus. The user interface control 20 can be arranged to include a home screen on the user interface display, see FIG. 16, and can be arranged to provide time of day and date information when selected by the user. While the day and date clock has been described as being a function of the core control 30, those skilled in the art will understand that the day and date clock function can be provided in the user interface control 20 as well.

Figure 17:
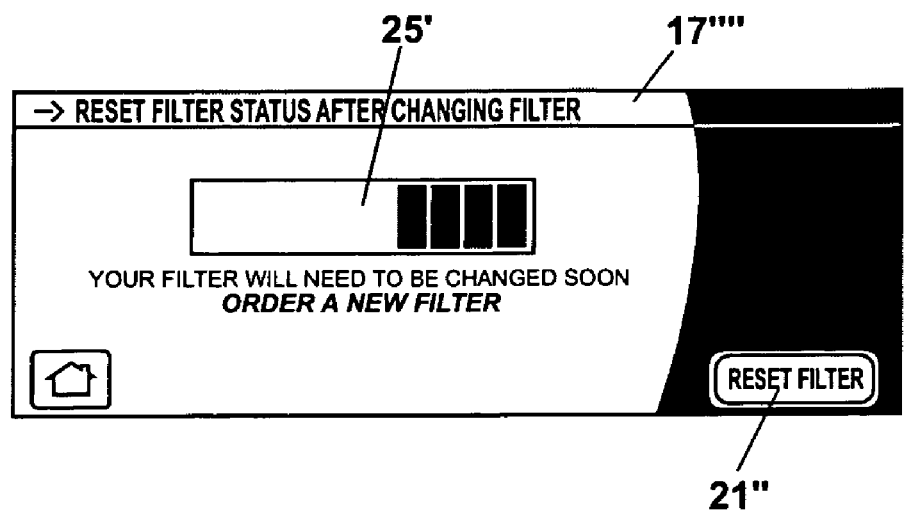
FIG. 17 is the user interface of FIG. 9 illustrating the filter status.

In-line water filters such as filter 14 shown in FIG. 1 have a effective life that can be predicted based on how long the filter has been in service and how much water has passed through the filter. Using the time of day and date clock described in the previous paragraph and information gathered from the core control 30, the valve control 40 can track the elapsed time since the water filter 14 has last been changed, and the amount of water passing through the filter 14 by accumulating information supplied by the flow sensor 41. The valve control 40 can report the usage and elapsed time to the user interface control 20 via the ISP bus. User interface control 20 can drive a filter condition display 25 on user interface 17 as shown on FIG. 8. Another embodiment of a filter condition display 25' is shown on user interface 17", see FIG. 17. In another embodiment, not shown, water filter status can be displayed using a tri-color indicator that can be a single LED, a grouping of discrete LEDs or Icons that can be arranged to indicate Good Filter, Order Filter or Change Filter. In another embodiment, not shown, the water filter indicator can be a multi-color bargraph indicator using discrete LEDs or Icons to indicate multiple stages of Good Filter, Order Filter or Change Filter status. In another embodiment, not shown, the water filter indicator can be a display that can indicate gallons remaining combined with Good Filter and Change Filter displays. Those skilled in the art will understand that other displays or arrangements can be used to indicate the water filter status. After a water filter 14 has been replaced, the user can reset the valve control by touching and holding the Filter Reset touch pad 21 on user interface 17 in FIG. 8 embodiment, or the Reset Filter touch pad 21" in the FIG. 17 embodiment. The touch and hold duration can be preset in the valve control at a predetermined period such as 3 seconds. The valve control 40 microcomputer 45 can be programmed via the flash programming port 46 to set the microcontroller to indicate the need to change a filter 14 as a function of elapsed time and water usage and the type and capacity of water filter 14 to be used in the brand/model of refrigerator freezer for which the valve control 40 is to be used.

Since core control 30 can include a time of day and date clock, core control 30 can be arranged to detect a power outage condition and to keep track of the number of hours that the power has been off. When power is restored the core control 30 can report a power outage condition to the user interface control 20 for display in display 22. User interface control 20 can also be arranged to cause a piezo beeper, not shown, to beep periodically for as long as the power outage condition is displayed. In order to time the duration of a power outage the time of day and date clock can be provided with a back-up battery and can include a reference clock to allow the core control to accumulate time during the power interruption. Core control 30 can be arranged to ignore nuisance power outages such as outages of less than one-hour duration. Likewise, outages greater than a maximum duration need not be timed. Accordingly, the minimum and maximum power outage amount can be calibration values flash programmed into the core control 30 microcontroller, not shown, and set based on the requirements of the brand/model of refrigerator freezer in which the core control 30 is to be used. In operation, a power outage condition and duration can be calculated by the core control 30 based on the reference clock and can be communicated to the user interface control 20 via the ISP bus. Once the minimum power outage time has accumulated, and power has been restored, the user interface control 20 can cause a power interruption and duration display on user interface display 22, see FIG. 8. A power interruption sufficient to cause a power interruption display on user interface display 22 can "lock out" user interface control 20 to prevent any user initiated operations of the user interface control 20 until the power interruption is cleared by the user. By requiring user intervention to resume normal operation of the water dispenser, users will be affirmatively advised of the power interruption condition so that the user can inspect the contents of the refrigerator freezer for spoilage depending on the duration of the power interruption. Touching or pressing the Clear touch pad 21 on user interface 17 can reset the power interruption function of core control 30. Core control 30 can also report the temperature in the refrigerator and/or freezer compartment at the end of the power outage and cause user interface control 20 to display the maximum temperature(s) reached during the power outage on the user interface display. Core control 30 can be connected to the refrigerator freezer control to obtain the compartment(s) temperature information.

Figure 13:
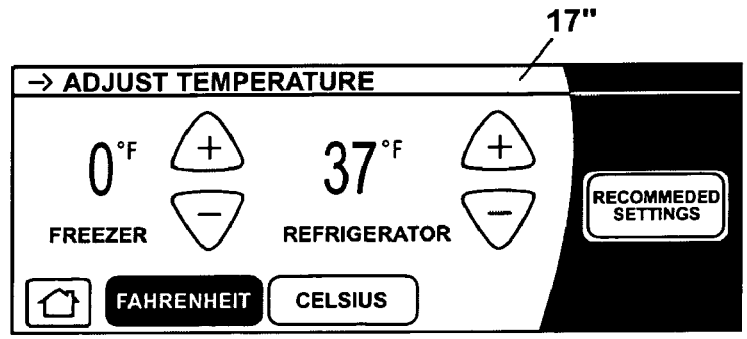
FIG. 13 is the user interface of FIG. 9 illustrating display of the temperature of the refrigerator and freezer compartments.
Figure 14:
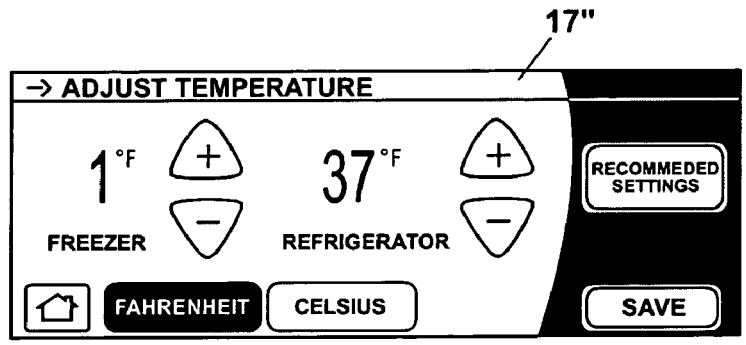
FIG. 14 is the user interface of FIG. 9 illustrating adjustment of the temperature of the refrigerator and or freezer compartments.

Turning to FIG. 13 and FIG. 14 user interface 17" can be arranged to display and adjust the temperature in the freezer compartment and/or the refrigerator compartment. In the embodiment illustrated in FIG. 13 and FIG. 14 the user interface control can communicate with a refrigeration control, not shown in the refrigerator freezer control system to determine the temperature in the refrigerator and freezer compartments. The user interface control 20 can drive user interface 17", which as described above can be a touch screen display, to display temperature information and receive user input by receiving user selections made by pressing the appropriate portion of the touch screen display.

Those skilled in the art will understand that additional modes of operation of the ice and water dispenser control 15 can be provided in the user interface, core and valve controls. Examples of modes of operation can include, but are not limited to: show room floor mode, manufacturing test mode, lock mode, light modes, ice modes, and ice dispensing modes of operation.

While the invention has been specifically described in connection with certain embodiments thereof, it is to be understood that this is by way of illustration and not of limitation and the scope of the appended claims should be construed as broadly as the prior art will allow.

We claim:

1. A refrigerator freezer having a water dispenser from a source of water comprising:
   a user accessible dispenser housing including a spout; and
   a water dispensing control having a measured fill mode of operation in which the water dispenser dispenses user set amount of water through the spout and a manual fill mode of operation in which the water dispenser dispenses water through the spout as long as the water dispenser is activated including:
   a fill mode selector;
   a water valve connected to the source of water;
   a valve control connected to the valve and to the water dispenser control;
   a water dispensing actuator connected to the water dispensing control; and
   a user interface control connected to the valve control comprising a user interface having one or more user operable selectors for a user to set the amount of water to be dispensed in the measured fill mode.

2. The refrigerator freezer of claim 1 wherein the water dispensing control includes a water flow sensor connected to the valve control and the user interface control includes a user interface display and wherein the water dispensing control displays the amount of water dispensed on the user interface display in the manual fill mode.

3. The refrigerator freezer of claim 2 wherein the user can select the units of measure for the amount of water dispensed.

4. The refrigerator freezer of claim 1 further including a user interface display connected to the user interface control.

5. The refrigerator freezer of claim 4 wherein the fill mode selector is one of the user operable selectors on the user interface.

6. The refrigerator freezer of claim 4 wherein one of the user operable selectors is a units selector, and wherein the units of measure selections include one or more of cups, ounces, liters and coffee cup quantities of water.

7. The refrigerator freezer of claim 6 wherein the user interface control displays the selected unit of measure on the user interface display.

8. The refrigerator freezer of claim 4 wherein one of the user operable selectors is a container selector and wherein the container selections include coffee pot, water bottle, custom, pitcher, favorite and preset.

9. The refrigerator freezer of claim 8 wherein the user operable selectors include a units selector and increase and decrease selectors wherein user selection of the amount of water dispensed in the measured fill mode includes operation of the increase or decrease selectors.

10. The refrigerator freezer of claim 9 wherein the user interface control displays the selected container and the amount of water to be dispensed into the selected container and the amount dispensed is displayed on the user interface display.

11. The refrigerator freezer of claim 1 wherein the dispenser housing includes the user interface, and the water dispensing actuator includes a press to fill selector on the user interface.

12. The refrigerator freezer of claim 11 wherein a momentary operation of the press to fill selector initiates dispensing of the set amount of water in the measured fill mode.

13. A refrigerator freezer having a water dispenser from a source of water comprising:
    a user accessible dispenser housing including a spout; and
    a water dispensing control having a measured fill mode of operation in which the water dispenser dispenses a predetermined amount of water through the spout and a manual fill mode of operation in which the water dispenser dispenses water through the spout as long as the water dispenser is activated including:
        a fill mode selector;
        a water valve connected to the source of water;
        a valve control connected to the valve and to the water dispenser control; and
        a water dispensing actuator connected to the water dispensing control, wherein the water dispensing control includes user pausing of water dispensing in the measured fill mode by operation of the water dispensing actuator.

14. The refrigerator freezer of claim 13 wherein the dispenser housing includes a paddle located adjacent the spout and arranged to be engaged by a container inserted in the dispenser housing under the spout, and the water dispensing actuator includes a switch operated by the paddle when a container is inserted into the housing under the spout, and user pausing in the measured fill mode includes moving the container out of engagement with the paddle.

15. The liquid dispenser of claim 13 wherein the dispenser housing includes a user interface and the water dispensing actuator includes a press to fill selector on the user interface, and user pausing in the measured fill mode includes pressing the press to fill button.

16. An ice and water dispenser for a refrigerator freezer comprising;
    a dispenser housing in the freezer door including a water spout, an ice chute;
    a refrigerated water container connected to the spout;
    an ice maker and ice dispenser in the freezer compartment positioned to provide ice pieces to the chute;
    a dispenser control having a measured fill mode of operation in which the ice and water dispenser dispenses a user set amount of water through the spout and a manual fill mode of operation in which the ice and water dispenser dispenses water through the spout as long as the dispenser is activated including:
        a user interface control comprising a user interface having one or more user operable selectors for a user to set the amount of water to be dispensed in the measured fill mode;
        a fill mode selector;
        a valve connected to the water container;
        a valve control connected to the user interface control and to the valve;
        a water flow sensor connected to the valve control;
        a water dispensing actuator connected to the user interface control; and
        an ice dispensing actuator connected to the user interface control.

17. The ice and water dispenser of claim 16 wherein the water dispenser actuator includes a press to fill button on the user interface and the ice dispenser actuator includes a press to dispense button on the user interface.

18. The ice and water dispenser of claim 17 wherein the water dispenser actuator also includes a paddle located in the dispenser housing adjacent the spout and a user can activate water dispensing by pressing a container against the paddle or by pressing the press to fill button.

19. The ice and water dispenser of claim 17 wherein the ice dispenser actuator also includes a paddle located in the dispenser housing adjacent the chute and a user can activate ice dispensing by pressing a container against the paddle or by pressing the press to dispense button.

20. The ice and water dispenser of claim 16 wherein the refrigerator freezer includes a refrigeration control that senses the temperature in the freezer compartment and the refrigerator compartment and the user interface includes a user interface display and the user interface control communicates with the refrigeration control and that displays the freezer compartment and refrigerator compartment temperatures on the user interface display.

21. The ice and water dispenser of claim 20 wherein one or more of the user operable selectors on the user interface allow the user to increase or decrease the selected temperature for the freezer compartment and the refrigerator compartment.

22. The ice and water dispenser of claim 16 wherein the dispenser control dispenses a predetermined amount of water to the ice maker to begin an ice making cycle.

23. An ice and water dispenser for a refrigerator freezer comprising;
    a dispenser housing in the freezer door including a water spout, an ice chute and a user interface including one or more user operable selectors;
    a refrigerated water container connected to the spout;

an ice maker and ice dispenser in the freezer compartment positioned to provide ice pieces to the chute;

a dispenser control having a measured fill mode of operation in which the ice and water dispenser dispenses a predetermined amount of water through the spout and a manual fill mode of operation in which the ice and water dispenser dispenses water through the spout as long as the dispenser is activated including:

a user interface control connected to the user interface to provide user selection of the amount of water dispensed in the measured fill mode;

a fill mode selector;

a valve connected to the water container;

a valve control connected to the user interface control and to the valve;

a water flow sensor connected to the valve control;

a water dispensing actuator connected to the user interface control; and an ice dispensing actuator connected to the user interface control;

wherein the user interface includes a user interface display screen and the dispenser control includes a time of day and date function that displays the time of day and date on the user interface display screen when the user interface control displays a home screen or when time of day is selected by a user, and wherein the dispenser control further includes monitoring power interruption and the time of day and date function includes a backup power supply, wherein the dispenser control measures the duration of the power interruption by storing the time of a reference clock in the dispenser control and calculating a duration in hours, and displays a power interruption message on the user display after power is restored advising the user that power has been interrupted and the duration of the power interruption.

24. The ice and water dispenser of claim 23 wherein the short nuisance power interruptions are ignored.

25. The ice and water dispenser of claim 23 wherein the user interface control further includes an audible signal generator and the user interface control produces an audible signal with the power interruption display.

26. The ice and water dispenser of claim 23 wherein the power interruption message further advises the user of the maximum temperature reached in the refrigerator freezer by reading the refrigerator temperature at the time the power is restored.

27. The ice and water dispenser of claim 23 wherein the user interface control further locks out the dispenser controls until the user acknowledges the power interruption.

* * * * *